United States Patent [19]
Rekai

[11] 3,761,018
[45] Sept. 25, 1973

[54] ELECTRONIC TEMPERATURE CONTROL APPARATUS HAVING A SPACE THERMOSTAT WITH OUTDOOR TEMPERATURE COMPENSATION

[75] Inventor: Andre Rekai, Scarborough, Ontario, Canada

[73] Assignee: Honeywell Inc., Minneapolis, Minn.

[22] Filed: Oct. 27, 1971

[21] Appl. No.: 192,910

[52] U.S. Cl. .................... 236/91, 165/26, 307/39, 330/134
[51] Int. Cl. ............................................ F25b 29/00
[58] Field of Search ...................... 236/91, 16, 1 E; 165/26; 307/39, 231; 330/134

[56] References Cited
UNITED STATES PATENTS
| | | | |
|---|---|---|---|
| 2,801,826 | 8/1957 | Stavnes et al. | 236/91 X |
| 3,292,687 | 12/1966 | Evans | 165/26 |

Primary Examiner—William E. Wayner
Attorney—Lamont B. Koontz et al.

[57] ABSTRACT

Electronic temperature control apparatus having a temperature responsive resistance space thermostat connected to an amplifier circuit for providing an output to control a modulating multi-stage controller adapted to control stages of heating and cooling apparatus. An outdoor temperature responsive resistance compensating thermostat is connected to the amplifier circuit for modifying the control effect of the space thermostat. The outdoor thermostat is connected through a first diode to provide compensation when the system is used for heating and through a second diode reversely connected when the system is used for cooling to selectively isolate the output of the outdoor thermostat from modifying the space thermostat control of either the heating and the cooling apparatus. Errors due to diode voltage drops and diode voltage drifts with temperature are eliminated.

4 Claims, 3 Drawing Figures

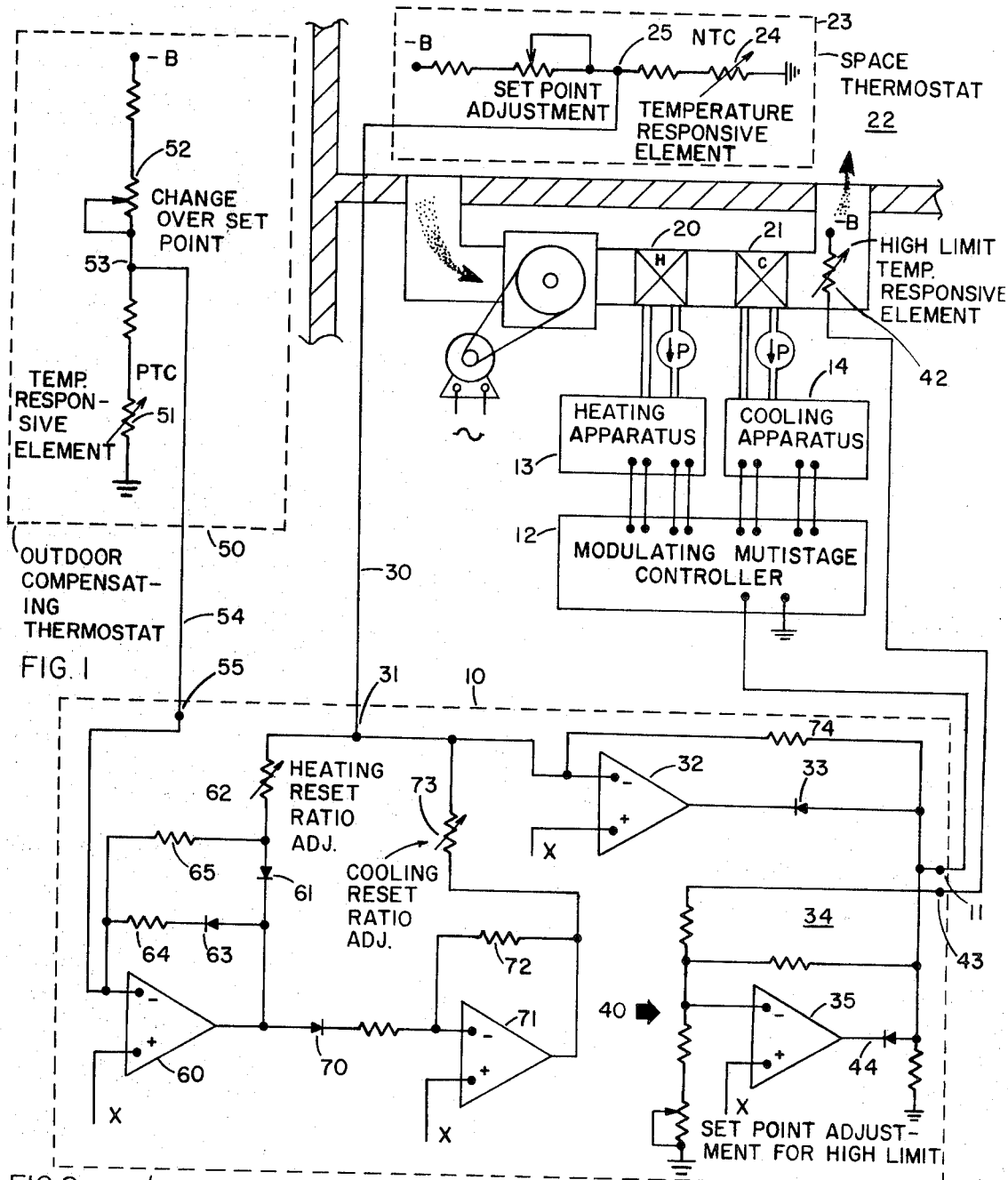
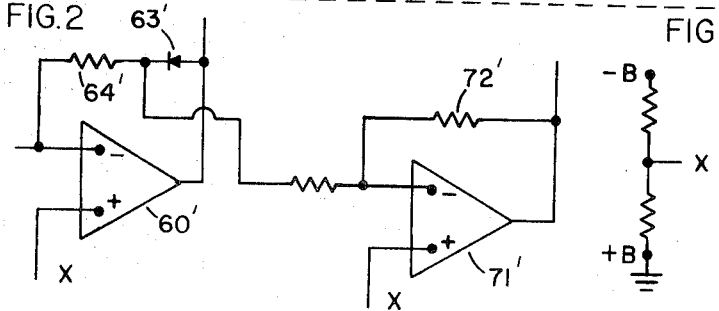

3,761,018

ELECTRONIC TEMPERATURE CONTROL APPARATUS HAVING A SPACE THERMOSTAT WITH OUTDOOR TEMPERATURE COMPENSATION

BACKGROUND AND SUMMARY OF THE INVENTION

Electronic temperature control apparatus wherein a main bridge circuit controls the temperature changing apparatus and a compensating bridge circuit connected thereto for compensating the space thermostat by the output of an outdoor compensating thermostat is quite common in temperature control. One particular system is shown in the Honeywell Inc. "Engineering Manual of Automatic Control" number 77-1000 3-59 having a copyright of 1958 in section 1 B23 wherein a single outdoor compensating thermostat is used in either a summer or winter compensating bridge depending on which of two changeover switches are closed to modify the output of a main bridge.

The connection of two bridge circuits to a load by means of isolation diodes so that only the bridge circuit having the highest output signal controls the load is shown in the British patent 1,047,443 as well as the Davis U.S. Pat. No. 2,504,965.

The applicant's invention is concerned with an electronic bridge circuit wherein the space thermostat controls temperature conditioning apparatus and the control by the space thermostat can be modified by the output of an outdoor compensating thermostat which is connected to an electrical circuit through at least one isolation diode to selectively modify the effect of the space thermostat in a predetermined manner during certain ranges of outdoor temperature without introducing diode errors in the control circuit.

FIG. 1 is a schematic representation of the electronic temperature control apparatus showing the space thermostat connected to the amplifier circuit and the outdoor compensating thermostat connected to the amplifier circuit through diodes for modifying the effect of the space thermostat.

FIG. 2 is a second embodiment of the invention showing a specific circuit of the amplifier circuit.

FIG. 3 is a representative showing of the power supply for use with the circuits of FIGS. 1 and 2.

DESCRIPTION OF THE INVENTION

Refering to FIG. 1 a panel or signal amplifier network circuit 10 has an output at terminal 11 which is adapted to control a conventional modulating multi-stage controller 12 for controlling temperature changing apparatus shown as stages of heating apparatus 13 and cooling apparatus 14 for a conventional heating and or cooling system. Specifically shown, two stages of heating obtained from heat exchanger 20 by supplying hot water from heating apparatus 13 and two stages of cooling are obtained from heat exchanger 21 by supplying chilled water from cooling apparatus 14. When air is passed through the heat exchangers into space 22, the temperature of space can be changed.

A space thermostat 23 mounted in space 22 comprises a voltage divider circuit having a temperature responsive resistance element 24 of a negative temperature coefficient (NTC) type connected to provide a current output signal at terminal 25 depending upon the resistance of element 24 and the set point adjustment. As the temperature of space 22 increases, the current at terminal 25 increases.

The output of the space thermostat is connected by circuit 30 to an input terminal 31 of panel 10 to provide an input to the current summing point of a conventional amplifier 32 which has its output connected by an isolation diode 33 to output terminal 11. Amplifier 32, as well as the other amplifiers to be mentioned in the specification, is of a conventional type wherein a change in the input current to the amplifier produces a reverse change in the output voltage having amplified magnitude. Each of the amplifiers has a second input terminal connected to an $x$ terminal of a conventional source of power shown in FIG. 3.

A limit circuit 34 comprises an amplifier 35 which has an input from a bridge circuit 40 having a high limit temperature responsive resistance element 42 which is adapted to be connected to the input terminal 43 of panel 10. High limit element 42 is mounted in the air supply duct delivering air to space 22 to respond to a high temperature during the heating operation. Amplifier 35 is connected by means of an isolation diode 44 to output terminal 11. Diodes, or voltage sensitive unidirectional current conducting devices 33 and 44, as with others mentioned later, operate to isolate the outputs so that depending upon which diode is back-biased, one of the amplifier outputs controls controller 12. If, during normal control by the output of amplifier 32, the output of amplifier 35 decreases below the output of amplifier 32, the high limit circuit 34 will take over control to limit the operation of controller 12 and thus the output of heating apparatus 13.

An outdoor compensating thermostat 50 comprises a voltage divider circuit having a temperature responsive resistance element 51 of a positive temperature coefficient (PTC) type and a changeover set point adjusting potentiometer 52 connected to provide the current output signal at terminal 53. The output of thermostat 50 is connected by circuit 54 to the input terminal 55 of panel 10 to the input of an amplifier 60. Amplifier 60 has a first output circuit through isolation diode 61 which is connected to the input of amplifier 32 through the heating reset ratio adjustment potentiometer 62. Amplifier 60 has a first feed-back circuit comprising diodes 61 and a resistor 65. Amplifier 60 has a second output through isolation diode 70 which is connected to the input of an amplifier and signal reversing apparatus 71 having a feed-back circuit including resistor 72. The output of amplifier 71 is connected through the cooling reset ratio adjustment potentiometer 73 to the input of amplifier 32. The parallel connected output circuits of amplifier 60 provide a discriminating circuit whereby the output of compensating thermostat 50 modifies the effect of thermostat 23 in one sense during a heating operation and in an opposite sense during cooling operation.

Another embodiment of the present invention is shown in FIG. 2 wherein the connecting circuit between amplifier 60' and 71' is modified. Diode 63' in the feed-back circuit is used as the isolation diode in the output circuit connected to amplifier 71'.

DESCRIPTION OF THE OPERATION OF THE INVENTION

Assuming that the space thermostat is to maintain a predetermined space temperature during a heating operation as selected by the set point adjustment, a drop in the space temperature results in an increase in the resistance of temperature responsive resistance element 24. The current at terminal 25 which is taken away from the input of amplifier 32 increases resulting in an increase in the voltage applied through diode 33 to the multi-stage controller 12 which is adapted to turn on heating. Depending upon the current input/output of the space thermostat 23, controller 12 modulates the heat output of the heating apparatus 13 until sufficient heat is delivered to the space to satisfy the space thermostat. As the space temperature increases, the voltage applied to the multi-stage controller returns to the null or balance voltage.

Outdoor compensating thermostat 50 is calibrated by changeover set point resistor 52 to provide zero input/output current to amplifier 60 at a predetermined outdoor temperature. During the heating season, a decrease in the outdoor temperature results in the decrease in the resistance of the temperature responsive element 51 and an increase in the output current at point 53. This current drives the output of 60 down until the current through 61 and 65 equals the input current at 53. The output of amplifier 60 is connected through diode 61 and resistor 62 to the input of amplifier 32 so that as the input of amplifier 60 increases, the voltage drop across resistor 65 increases. Because the voltage across resistor 62 is the same as across resistor 65, the current taken away from the input of amplifier 32 increases. This current will flow downward through resistor 62 and will be summed with the current going to the space thermostat from the input of 32. This current has to be supplied by the output of 32 through 33 and 74. The result is to increase the output of controller 12 as if the output of the space thermostat 23 was modified or reset to bring about more heating to compensate for the lower outdoor temperature. As the outdoor temperature drops, a further resetting of the control of the space thermostat on the heating apparatus will take place.

During a cooling operation, an increase in temperature of space thermostat 23 and thus, the temperature of element 24, results in an increase in the current applied to amplifier 32. The decrease in output causes controller 12 to operate in the opposite direction from the null position to bring about the operation of cooling apparatus 14. An increase in the outdoor temperature results in a decrease in current being applied (rather than taken away) to amplifier 60 and an increase in the amplifier output. As diode 61 is now back-biased, current will not flow through resistor 62, but through 63 and 64. The output of amplifier 60 is now connected to the input of amplifier 71 through the forward biased diode 70. The voltage drops across 63 and 70 are equal and cancel each other. With the reversed output of amplifier 71, an increasing input voltage results in a decrease in the current flow through resistor 73 and thus will compensate or modify the output of thermostat 23 to result in an operation of controller 12 for less cooling for a predetermined load on space thermostat 23 as the outdoor temperature increases.

The second embodiment of the invention disclosed in FIG. 2 operates in a similar manner with the exception that the same diode which is used in the feed-back circuit of amplifier 60' is used as the isolation to couple the output of amplifier 60' to the input of amplifier 71'. With the circuit of FIG. 1 modified by that portion of this circuit disclosed in FIG. 2, the temperature control apparatus making use of the space thermostat and the outdoor compensating thermostat operates in a similar manner to control the heating and cooling apparatus connected to controller 12.

The embodiments of the invention in which an exclusive property or right is claimed are defined as follows:

1. Control apparatus comprising:
    amplifier means having an input circuit and an output circuit,
    said output circuit being adapted to control conditioning apparatus for supplying conditioned medium to a space,
    discriminating circuit means including two oppositely connected unidirectional voltage sensitive current conducting devices having an input circuit and two output circuits, and
    circuit connecting means connecting each of said output circuits of said discrimination circuit means to said input circuit of said amplifier means,
    said input circuit of said amplifier means being adapted to be connected to a space condition responsive apparatus whereby upon a need for a change in the condition of the space, the operation of the conditioning apparatus can be changed,
    said input circuit of said discriminating circuit means being adapted to be connected to an outdoor condition responsive apparatus for receiving a signal to be applied to said amplifier means to modify the effect of the space condition responsive apparatus on the conditioning apparatus by an amount depending upon which of said two output circuits are used,
    the space condition responsive means is a space thermostat responsive to space temperature and adapted to have a voltage output signal indicative of the space temperature and,
    the outdoor condition responsive means is an outdoor thermostat responsive the outdoor temperature and adapted to have a voltage output signal indicative of outdoor temperature.

2. The invention of claim 1 wherein:
    said unidirectional voltage sensitive current conducting devices are diodes which are connected in reverse manner to allow said signal to pass to one of said output circuits when below a predetermined value and to another of said output circuits above a predetermined value.

3. The invention of claim 2 comprising;
    signal reversing means connected in said another output circuit for reversing the sense of said signal wherein,
    said one output circuit of said discriminating circuit means allows a signal indicative of an outdoor temperature in a range below a predetermined value to change the effects of the signal indicative of space temperature on said signal amplifier means to increase the temperature in the space as the outdoor temperature decreases, and
    said another output circuit of said discriminating circuit means allows a signal indicative of a high outdoor temperature in a range above a predetermined value to effect the signal indicative of space temperature on said signal amplifier means to increase the temperature in the space as the outdoor temperature increases.

4. Control apparatus comprising;

circuit means having an input circuit and an output circuit, said output circuit being adapted to control conditioning apparatus circuit connection means adapted to connect space condition responsive means to said input circuit for controlling said conditioning apparatus, and discriminating circuit means comprising an unidirectional voltage sensitive current conducting device adapted to connect an outdoor condition responsive means to said input circuit whereby said outdoor condition responsive means can modify the effect of said space condition responsive means on said conditioning apparatus, said current conducting device is a diode whereby upon a signal voltage from the space responsive means being greater than a signal voltage from the outdoor condition responsive means current conducts through a circuit associated with said diode to modify the effect of the space condition responsive means on the conditioning apparatus without diode errors being introduced, and said conditioning apparatus is temperature conditioning apparatus and the space and outdoor condition responsive means are temperature responsive means whereby the control of the temperature conditioning apparatus by the space temperature responsive means is modified by the outdoor temperature responsive means.

* * * * *